Figure 1:
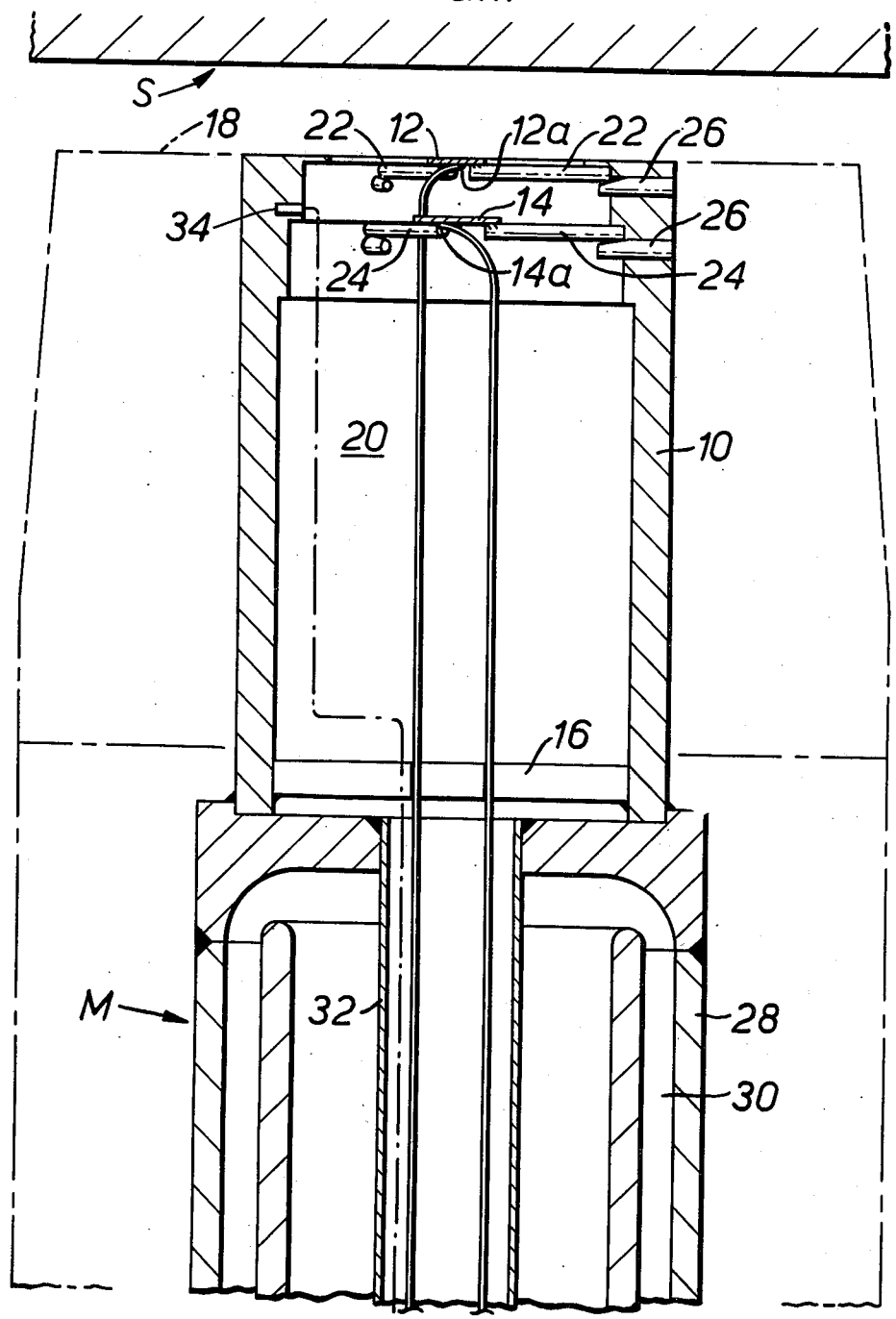

United States Patent [19]
English et al.

[11] 3,908,459
[45] Sept. 30, 1975

[54] TEMPERATURE SENSING DEVICE

[75] Inventors: Paul Everitt English, Horsham; Ian Reginald Ashcroft, Purley; Paul Alfred Norris, London; Frank Michael Salter, Coulsdon; William Robert Laws, Worcester Park; Herbert Raymond McChesney, St. Albans, all of England

[73] Assignee: The British Iron and Steel Research Association, London, England

[22] Filed: June 14, 1973

[21] Appl. No.: 370,026

[52] U.S. Cl. .................... 73/341; 73/343 R; 73/359
[51] Int. Cl.² ......................................... G01K 13/00
[58] Field of Search . 136/230, 227; 73/341, DIG. 7, 73/359, 342, 340, 343 R, 190 H; 266/24, 33 R; 432/50, 126; 236/15 B

[56] References Cited
UNITED STATES PATENTS

| | | |
|---|---|---|
| 3,417,617 | 12/1968 | Rall .................................... 136/230 |
| 3,419,438 | 12/1968 | Stottle ................................. 136/230 |
| 3,465,315 | 9/1969 | Alexander ............................. 73/359 |
| 3,596,518 | 8/1971 | Kirkpatrick ...................... 73/DIG. 7 |

*Primary Examiner*—S. Clement Swisher
*Assistant Examiner*—Denis E. Corr
*Attorney, Agent, or Firm*—Bacon & Thomas

[57] ABSTRACT

A temperature sensor, for use specifically in a metal slab reheating furnace, comprises a housing containing an outer temperature sensing disc and thermocouple locatable in close proximity to a slab, and an inner temperature sensing disc and thermocouple for measuring an axial component of heat transferred inwardly from the outer disc. The true surface temperature of the slab is determined from a combination of the measurements recorded by the two sensing discs.

7 Claims, 2 Drawing Figures

TEMPERATURE SENSING DEVICE

This invention relates to a temperature sensing device which may be used, for example, in the measurement of slab temperature in a reheating furnace for steel slabs as set forth in our co-pending American patent application Ser. No. 314,392. filed Dec. 12, 1972 and now U.S. Pat. No. 3,806,309.

In the aforesaid co-pending application there is described a steel slab reheating furnace including a plurality of temperature sensors located to be adjacent the under surfaces of the steel slabs as they pass through the furnace and wherein the sensors each comprise a thermocouple for obtaining a reading of the temperature of the under surfaces of the heated slabs. In such an arrangement the thermocouple in each sensor is mounted in a suitable support at the sensing end of the sensor and, although such thermocouple support may be thermally insulated from the remainder of the sensor, certain problems may nevertheless arise in obtaining an accurate measure of the slab temperature as there will generally be a transfer of heat from the thermocouple support into the interior of the sensor resulting in an inaccurate measurement of the slab surface temperature.

It is an object of the present invention to provide a temperature sensor for use in high temperature surroundings for the measuring of the temperature of an article located in such surroundings and it is a particular, but not exclusive object, to provide a temperature sensor for use in the measurement of the slab temperature in a steel slab reheating furnace wherein the temperature may be of the order of 1300°C.

In accordance with one aspect of the present invention there is provided a temperature sensor comprising a housing and at least two temperature sensing elements disposed within said housing, each said element being substantially thermally insulated from said housing, a first said element being located at one end of the housing whereby it may be positioned in close proximity to an object whose temperature is to be measured and a second said element being spaced from said first element axially inwardly of said housing whereby it may measure an axial component of heat transferred inwardly of said housing from said first element.

In accordance with a further aspect of the invention there is provided, in a metal slab reheating furnace comprising means for supporting metal slabs during their movement through the furnace, a plurality of heat sources located within the furnace and at least one temperature sensor disposed at a level below the top of the supporting means, said sensor comprising a housing and at least two temperature sensing elements disposed within said housing and being substantially thermally insulated therefrom, a first said element being located at one end of the housing and a second said element being spaced from said first element axially inwardly of said housing, the arrangement being that, in use, said first element is disposed in close proximity to and facing the underside of a slab being heated, said first element being substantially shielded from ambient radiation within the furnace whereby radiation is received on and measured by said first element substantially solely from the under surface of the slab and said second element measures an axial component of heat transferred inwardly of said housing from said first element.

Each said temperature sensing element may comprise a plane metal member, preferably a steel disc, having a respective thermocouple intimately associated therewith. The first disc, located at the end of the housing, is conveniently of a smaller diameter than the second disc, spaced axially inwardly thereof, whereby substantially all of the axial component of heat transferred inwardly of the housing from the first disc is received on the second disc. Preferably skeletal support means are provided for each disc extending thereto from the housing whereby heat conducted to the discs from the housing is minimal.

The interior of the housing is preferably substantially filled with thermally insulating material and the exterior of the housing is preferably surrounded by thermally insulating material disposed level with said end of the housing whereby the first sensing element may be substantially shielded from ambient radiation and radiation may be received on the first element substantially solely from the object whose temperature is being measured.

A temperature sensor in accordance with the invention may also include at least one additional temperature sensing element located within the housing on the interior side wall thereof for measuring a radial component of heat transferred to said wall from the first temperature sensing element.

Figure 2:
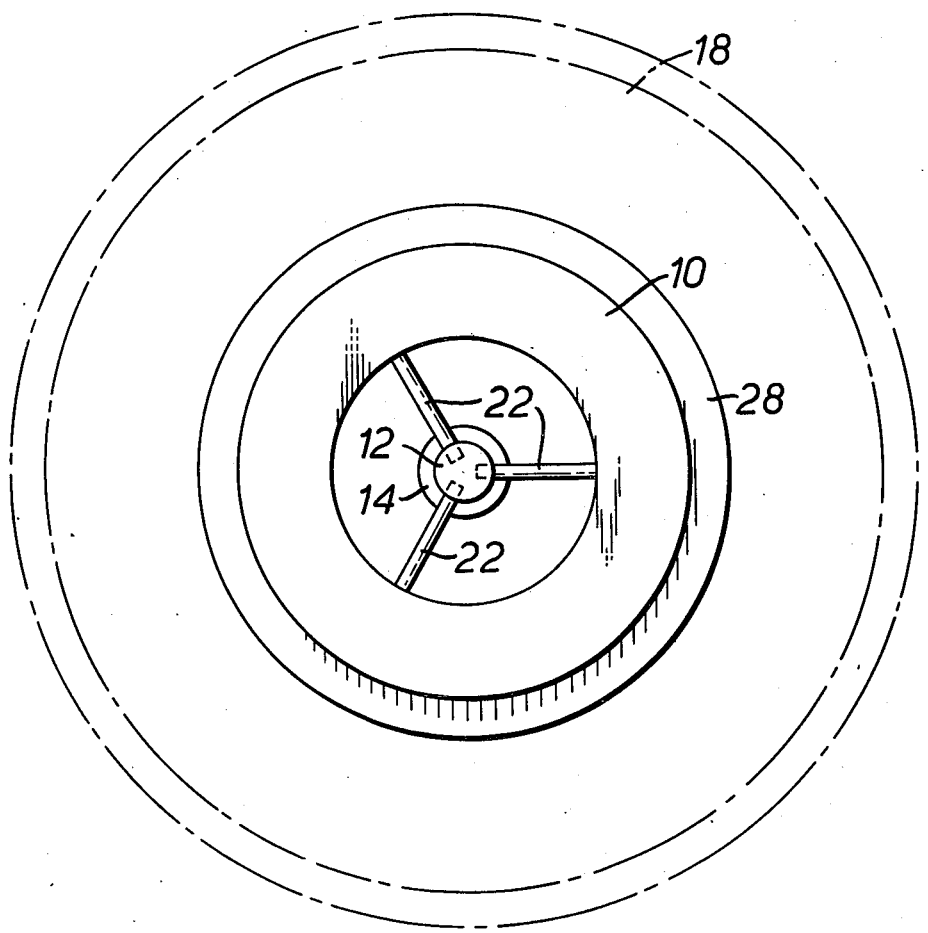

One embodiment of temperature sensor constructed in accordance with the invention will now be described herein by way of example with reference to the accompanying drawings wherein:

FIG. 1 is a transverse cross sectional view through a subject sensor mounted on an appropriate cooling support and wherein certain of the thermal insulant within the sensor housing is omitted in the interest of clarity and FIG. 2 is a top plan view of the sensor shown in FIG. 1 again with certain of the thermal insulant omitted.

The temperature sensor described and illustrated herein is carried on appropriate water cooled mountings M for use in a reheating furnace for steel slabs S and includes a housing 10 providing support and containment for two sensing discs 12 and 14 each thermally insulated to the maximum possible extent from the housing 10.

The housing 10 is of generally cylindrical configuration and in use in a reheating furnace would be disposed in the upright attitude illustrated having its lower end closed by a pair of semi-circular clamping plates 16 and the upper or sensing end of the housing 10 containing the sensing discs 12 and 14. The housing 10 is fully surrounded by a sleeve 18 of thermal insulant and the interior of the housing is packed with further thermally insulating material 20 from the plates 16 up to the level of the upper end of the housing. At the said upper end of the housing 10 the two sensing discs 12 and 14 are located in longitudinally spaced apart relation on the centre line of the housing. The outer disc 12 is located flush with the upper end of the housing 10 whilst the inner disc 14 is spaced an appropriate distance below the first disc 12. In one example of sensor the first disc 12 has a diameter of 1.0 cms; the second disc 14 has a diameter of 1.5 cms, whilst the spacing between the two discs is of the order of 1.0 cms. Each of the sensing discs 12 and 14 has a respective thermocouple 12a and 14a secured to the under surface thereof with the thermocouple leads running downwardly through the thermal insulant 20 within the housing 10 and emerging through appropriate apertures defined between the clamping plates 16 at the lower end of the housing.

It will be appreciated that it is highly desirable to maintain the best possible thermal insulation of the sensing discs 12 and 14 relative to the housing 10 and this aim is achieved in the example illustrated by supporting each disc 12 and 14 relative to the housing 10 by means of three limbed webs 22 and 24 respectively (see FIG. 2). Each disc 12 and 14 and its respective support web 22 and 24 is conveniently formed of a high cobalt steel and each web may be supported relative to the housing 10 by means of welding it to associated support pins 26 extending radially through the housing walls into its interior; one pin 26 being provided for each limb of each of the two webs 22 and 24.

In use in a reheating furnace for steel slabs each sensor is mounted on a water cooled support 28 in such a position as to present the outer sensing disc 12 in close proximity to the under surface of the steel slabs passing through the furnace. The water cooled support may be of any convenient form compatible with furnace design, and as illustrtaed herein, such support may include a water jacket 30 surrounding a central hollow pipe 32 through which are ducted the thermocouple leads from the thermocouples 12a and 14a.

As mentioned previously the temperature in a reheating furnace may approximate 1300°C and in such surroundings the outer sensing disc 12 may transfer heat continuously from its under surface to the interior of the housing 10 thus giving an inaccurate measure of the slab surface temperature by the associated thermocouple 12a. The second sensing disc 14 in this construction functions to measure the heat transferred to the housing interior from the under surface of the outer disc 12 whereby the slab temperature may be accurately calculated from the combination of the two measured temperatures given by the thermocouples 12 and 14a. To facilitate a true measure of the heat transferred from the disc 12 to the disc 14 the disc 12 is of a smaller diameter than the disc 14 whereby substantially all of the heat transferred from the under surface of the smaller disc 12 may be received upon the surface of the larger disc 14 and appropriately measured by the associated thermocouple 14a.

Although a temperature sensor as hereinbefore described functions well in practice, it may be found that the inner disc 14 may not be capable of measuring all of the heat transferred from the outer disc 12. The heat transferred from the outer disc 12 may have a certain radial component of transfer and, for increased accuracy, it may be desirable to position a further thermocouple in the housing 10 at the interior side wall thereof to measure such radial component of heat transfer from the disc 12 to said wall the slab temperature then being calculated from a combination of the measured temperatures of thermocouples 12a, 14a and the further thermocouple. In FIG. 1 of the drawings such an additional thermocouple is indicated at 34, approximately level with the inner disc 14, although this position is not absolutely critical. It may be found that even further thermocouples may be advantageously positioned in the housing 10, or plates 16, for measuring further components of transferred heat.

It will be appreciated that it is most important that the outer sensing disc 12 only senses the heat impinging on it directly from the under surface of a slab in the reheating furnace whilst it is equally important that the second sensing disc 14 only functions to measure the heat transferred to it from the outer disc 12. To achieve these ends the thermal insulants 18 and 20 are provided respectively both outside the housing 10 and within it, and also within the space between the sensing discs 12 and 14 and their respective supporting webs 22 and 24, whereby such discs 12 and 14 are conveniently "thermally de-coupled" from the housing 10.

We claim:

1. A temperature sensor comprising a housing and at least two temperature sensing elements disposed within said housing, each said element being substantially thermally insulated from said housing, a first said element being located at one end of the housing whereby it may be positioned in close proximity to an object whose temperature is to be measured, and a second said element being spaced from said first element axially inwardly of said housing whereby it may measure an axial component of heat transferred inwardly of said housing from said first element, each said temperature sensing element comprising a plane metal member having a respective thermocouple intimately associated therewith, said plane metal members comprising respective first and second discs, said first disc, located at the end of the housing, being of a smaller diameter than said second disc, spaced axially inwardly thereof, whereby substantially all of the axial component of heat transferred inwardly of the housing from said first disc is received on said second disc.

2. A temperature sensor comprising a housing, at least two temperature sensing elements disposed within said housing, each said element being substantially thermally insulated from said housing, a first said element being located at one end of the housing whereby it may be positioned in close proximity to an object whose temperature is to be measured, and a second said element being spaced from said first element axially inwardly of said housing whereby it may measure an axial component of heat transferred inwardly of said housing from said first element, and at least one additional temperature sensing element located within the housing at the interior side wall thereof for measuring a radial component of heat transferred to said wall from said first element.

3. In a metal slab reheating furnace comprising means for supporting metal slabs during their movement through the furnace, a plurality of heat sources located within the furnace and at least one temperature sensor disposed at a level below the top of the supporting means, said sensor comprising a housing and at least two temperature sensing elements disposed within said housing and being substantially thermally insulated therefrom, a first said element being located at one end of the housing and a second said element being spaced from said first element axially inwardly of said housing, the arrangement being that, in use, said first element is disposed in close proximity to and facing the underside of a slab being heated, said first element being substantially shielded from ambient radiation within the furnace whereby radiation is received on and measured by said first element substantially solely from the under surface of the slab and said second element measures an axial component of heat transferred inwardly of said housing from said first element.

4. A furnace as claimed in claim 3 wherein each said temperature sensing element comprises a plane metal member having a respective thermocouple intimately associated therewith.

5. A furnace as claimed in claim 4 wherein said members comprise respective first and second discs, said first disc located at the end of the housing being of a smaller diameter than said second disc spaced axially inwardly thereof whereby substantially all of the axial component of heat transferred inwardly of the housing from said first disc is received on said second disc.

6. A furnace as claimed in claim 3 including at least one additional temperature sensing element located within said housing at the interior side wall thereof for measuring a radial component of heat transferred to said wall from said first element.

7. A furnace as claimed in claim 3 wherein the interior of the housing is substantially filled with thermally insulating material and the exterior of the housing is surrounded by thermally insulating material disposed level with said end of the housing.

* * * * *